Patented Apr. 26, 1949

2,468,094

UNITED STATES PATENT OFFICE 2,468,094

CASTING COMPOSITIONS COMPRISING METHYL METHACRYLATE AND GLYCOL DIMETHACRYLATES

Barnard Mitchel Marks, Newark, N. J., assignor to E. I. du Pont de Nemours & Company, Wilmington, Del., a corporation of Delaware No Drawing. Application May 10, 1947, Serial No. 747,321

7 Claims. (Cl. 260—45.5)

This invention relates to the casting of polymerizable compounds and, more particularly, to methyl methacrylate compositions adapted for casting and to a method of casting such compositions.

It is well known that methyl methacrylate is a liquid in the monomeric state and polymerizes by an exothermic reaction to form a solid polymer; a number of other organic compounds are known to behave similarly. A procedure for obtaining these polymers in desired shapes involves introducing a liquid monomer into a mold and subjecting the mold to polymerization conditions whereby the monomer is converted to solid polymer of the approximate shape of the mold. This procedure is known in the art as "casting" and is to be distinguished from molding, i. e., compression, or injection molding or extrusion, procedures carried out under very considerable pressure.

A problem in casting any of these monomers is the great shrinkage factor involved, e. g., there is a shrinkage factor of 21% in the conversion of liquid monomer to solid polymer in the case of methyl methacrylate. As disclosed in Hiltner U. S. Patent 2,347,320, this shrinkage factor may be materially reduced by the expedient of suspending granular polymer in the liquid monomer and pouring this still fluid composition into the casting mold. As there is a substantial proportion of polymer in the composition, the over-all shrinkage of the composition in the mold during the polymerization of the monomer is, of course, reduced.

The shrinkage discussed above is that inherent in the conversion of a liquid monomer to a solid polymer. To a certain extent that shrinkage takes place before the casting composition is converted into a solid body and, therefore, by flow a mold may be filled out during the course of this shrinkage so that the final casting approaches the dimensions of the mold cavity. However, the polymerization reaction is an exothermic one and in the casting of articles from liquid monomers there is also a shrinkage factor resulting from the fact that the casting is formed into a rigid solid at an elevated temperature and then, obviously, must be cooled down to atmospheric temperature. The thermal shrinkage thus involved is not susceptible to compensation by flow of the casting composition; to the extent the casting shrinks in its transition from the polymerization temperature to atmospheric temperature, its dimensions will vary from those of the mold cavity in which it is made.

The thermal shrinkage is not of critical significance where the dimensions of a casting are not important. Further, where the least dimension of a casting is relatively small, i. e., as in a thin sheet, it is possible to control the temperature of the polymerizing mass to a considerable degree and thus prevent any great rise in temperature. But, in producing a casting whose least dimension is quite substantial and the dimensions of the casting are required to be highly accurate, for example, television mirrors and similar optical castings, thermal shrinkage has presented a problem which the art has been unable to solve. Even carrying out the polymerization in an oven or autoclave at very moderate temperature, a procedure which may involve too much time to be really feasible economically, fails to overcome the difficulty of thermal shrinkage because the heat generated by the polymerization reaction cannot be dissipated efficiently and peak temperatures of 120–180° F. above the surrounding temperature are frequently encountered in a casting having a substantial least dimension.

An object of the present invention is to provide a new and improved casting composition. A more particular object is to provide a methyl methacrylate casting composition which may be cast into articles of substantial least dimension and without appreciable variation from the dimensions of the mold cavity in which the casting is made. A still further object is to provide such a composition and a method of casting whereby the thermal shrinkage normally involved in making a casting is substantially eliminated. Other objects will be apparent from the description of the invention given hereinafter.

The above objects are accomplished according to the present invention by admixing 63 to 72 parts of granular methyl methacrylate polymer with 37 to 28 parts of a mixture of 50% to 80% of methyl methacrylate monomer and 50% to 20% of the monomeric dimethacrylate esters of a mixture of glycols having the formula

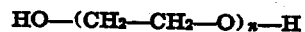

wherein $n$ is an integer, the mixture of glycols having an average molecular weight between 185 and 270, and thereafter subjecting the resulting composition to polymerization conditions.

In a preferred form, the mixture of monomers is introduced into a mold together with polymerization catalyst, if any is to be used, thereafter the methyl methacrylate polymer of particle size substantially passing a 20-mesh screen and being retained on a 150-mesh screen, is introduced into the mold, any residual air bubbles are removed from the contents of the mold by vibrating the mold slightly, and the mold placed in an autoclave or otherwise subjected to a mildly elevated temperature in the neighborhood of 90° F. to 140° F. until the mold contents are substantially completely polymerized.

It has been discovered by employing a composition as specified above that even articles of substantial least dimension may be cast with very little rise in the temperature of the polymerizing mass. For example, castings may be made without evolving temperatures more than 10°–20° F. above the surrounding atmosphere. The explanation for this presumably is that the heat normally evolved as a result of the exothermic polymerization reaction is offset to a great degree by the heat absorbed in the course of the methyl methacrylate polymer dissolving in the mixture of monomers. While methyl methacrylate polymer will dissolve relatively rapidly in methyl methacrylate monomer so that the process of solution is terminated before heat is generated on an appreciable scale by the polymerization reaction, the presence of the monomeric dimethacrylate esters of the mixture of glycols in the mixture of monomers of the present invention results in the methyl methacrylate polymer dissolving quite slowly so that heat is being absorbed continuously by the process of solution during the period heat is being generated by the polymerization reaction. In other words, the over-all heat is the heat evolved (polymerization) minus the absorbed heat (solution) and employing the casting composition of this invention this over-all heat is relatively slight and thus polymerization of substantial masses of casting composition may be effected without the peak temperature of the polymerization reaction rising more than a few degrees above the temperature of the surrounding atmosphere.

The monomeric dimethacrylate esters of the mixture of glycols used herein may be prepared by the esterification of methacrylic acid with suitable mixtures of glycols or by mixing the preformed esters, the mixture of monomers being indistinguishable in either case. The preparation of these monomers is described in detail in Anderson and Ramler application Serial No. 671,395, filed May 21, 1946, entitled "Bifunctional methacrylates," said application being assigned to the assignee of the present application.

For convenience of expression the monomeric dimethacrylate esters of the mixtures of glycols as indicated above will be referred to hereinafter as "glycol diesters." Preferably, the mixture of glycols used in preparing the glycol diesters, has an average molecular weight of about 200, i. e., from 185 to 215, and $n$ is an integer from 1 to 20 in the formula.

The following examples wherein all parts are by weight unless otherwise specified, illustrate specific embodiments of the invention.

*Example I*

The casting composition used was:

| | Parts |
|---|---|
| Granular methyl methacrylate polymer | 630 |
| Monomeric glycol diesters of polyethylene glycol 200 | 130 |
| Methyl methacrylate monomer | 240 |
| Polymerization catalyst: | |
|    Cobalt resinate | 4 |
|    Lauroyl peroxide | 2 |
| 1% solution of dioctyl ester of sodium sulfosuccinate in methyl methacrylate monomer | 2 |

The expression "polyethylene glycol 200", as herein used, designates a mixture of various glycols of the formula given above, which mixture has an average molecular weight of 200±15.

The methyl methacrylate monomer, polymerization catalyst, and the sulfosuccinate were thoroughly mixed and filtered to remove any solids. The monomeric glycol diesters were then mixed with the filtered solution and the resulting readily fluid mixture was poured into a glass cell having a cavity adapted to give castings representing 0.825 inch thick sections 14 inches in diameter of a sphere having a 24 inch radius. The granular polymer was then added to the cell while the cell was vibrated slightly to shake out residual air bubbles.

The contents of the cell were polymerized by placing the cell in an autoclave held at 115° F. for 12 hours. A casting of excellent surface characteristics and faithfully conforming to the dimensions of the cell cavity was obtained. Despite the relatively great least dimension of the casting, i. e., 0.825 inch, the peak temperature of the polymerizing mass was not appreciably above the temperature of the autoclave.

The inclusion of the dioctyl ester of sulfosuccinate is entirely optional, its function being to reduce any tendency of the casting to adhere to the walls of the cell. Also, it is not essential to use the combination of cobalt resinate and lauroyl peroxide as the polymerization catalyst and, in fact, polymerization catalyst may be omitted entirely. The cobalt resinate imparts a reddish color to the casting which ordinarily would not be desired in a transparent casting. However, in the casting of this example, which casting is designed for use as a television mirror and, hence, will have its reflecting surface silvered, the transparency or appearance of the casting is of no consequence.

*Example II*

The casting composition used was:

| | Parts |
|---|---|
| Granular methyl methacrylate polymer | 1800 |
| Monomeric glycol diesters of polyethylene glycol 200 | 294 |
| Isobutyl methacrylate monomer | 34 |
| Methyl methacrylate monomer | 548 |
| Polymerization catalyst: | |
|    Cobalt resinate | 2.09 |
|    Lauroyl peroxide | 1.13 |
| Dioctyl ester of sodium sulfosuccinate | 1.13 |

The polymerization catalyst and the sulfosuccinate were dissolved in a portion of the methyl methacrylate monomer which was filtered and added to the remainder of the monomers. The granular polymer was placed in a glass cell identical with that used in Example I and the mixture of monomers was then poured into the cell. Polymerization was effected by leaving the cell in an autoclave maintained at 115° F. for 3 days.

A casting having surface characteristics and dimensions comparable to that of Example I, was obtained. The peak temperature of the polymerizing mass was not sufficiently above the temperature of the autoclave to become a complicating factor in any respect.

Example III

The casting composition used was:

| | Parts |
|---|---|
| Granular methyl methacrylate polymer | 1648 |
| Monomeric glycol diesters of polyethylene glycol 200 | 277 |
| Methyl methacrylate monomer | 554 |
| Polymerization catalyst: | |
|    Cobalt resinate | 2.08 |
|    Lauroyl peroxide | 1.04 |
| Dioctyl ester of sodium sulfosuccinate | 0.07 |

The polymerization catalyst and sulfosuccinate were dissolved in a portion of the methyl methacrylate monomer, filtered, and the filtered solution added to the remainder of the monomers. The monomeric mixture thus obtained was added portionwise along with the granular polymer to a glass cell such as used in Example I. After filling the cell it was shaken on a vibrator for one-half hour to even the distribution of its contents and remove residual air bubbles. Polymerization was carried out by placing the cell in an autoclave maintained at 130° F. for 18 hours. A casting comparable to that in the foregoing examples was obtained and no appreciable rise in temperature due to the exothermic polymerization reaction was encountered.

Example IV

The casting composition used was:

| | Parts |
|---|---|
| Granular methyl methacrylate polymer | 1643 |
| Monomeric glycol diesters of polyethylene glycol 200 | 274 |
| Methyl methacrylate monomer | 504 |
| Polymerization catalyst: | |
|    Cobalt resinate | 1.96 |
|    Lauroyl | 1.09 |
| Dioctyl ester of sodium sulfosuccinate | 1.09 |

The polymerization catalyst and sulfosuccinate were dissolved in a portion of the methyl methacrylate monomer which was filtered and added to the remainder of the monomers. The granular polymer was poured into a cell identical with that used in Example I and the monomer mixture was added and the cell vibrated to remove residual air bubbles. Polymerization was carried out by placing the cell in an autoclave maintained at 115° F. for 18 hours. A casting comparable to that of Example I was obtained without any complication due to rise of temperature above that of the autoclave.

Example V

The casting composition used was:

| | Parts |
|---|---|
| Granular methyl methacrylate polymer | 1691 |
| Granular isobutyl methacrylate polymer | 12 |
| Monomeric glycol diesters of polyethylene glycol 200 | 281 |
| Methyl methacrylate monomer | 521 |
| Polymerization catalyst: | |
|    Cobalt resinate | 2.01 |
|    Lauroyl peroxide | 1.00 |
| Dioctyl ester of sodium sulfosuccinate | .20 |

The polymerization catalyst and sulfosuccinate were mixed with a portion of the methyl methacrylate monomer, filtered, and the filtered solution added to the remainder of the monomers. The resulting monomer mixture was added portionwise alternately with the mixture of granular polymers to a cell such as used in Example I. The cell was allowed to stand for 4 hours and then was placed in an autoclave maintained at 115° F. for 18 hours. At the end of this time polymerization was complete and a casting of excellent surface characteristics and faithful reproduction of the cell dimensions was obtained.

Example VI

The casting composition used was:

| | Parts |
|---|---|
| Granular methyl methacrylate polymer | 1527 |
| Monomeric glycol diesters of polyethylene glycol 200 | 341 |
| Methyl methacrylate monomer | 341 |
| Polymerization catalyst: | |
|    Cobalt resinate | 3.0 |
|    Alpha alpha' azo diisobutyronitrile | 0.6 |
| Dioctyl ester of sodium sulfosuccinate | 0.6 |

The procedure of Example IV was followed and a casting comparable to that of the foregoing examples was obtained but in this instance, the casting was of quite dark red color.

It will be understood that the above examples are merely illustrative and the invention broadly comprises introducing the mixture of granular methyl methacrylate polymer and the mixture of monomers into a mold and subjecting the mold to polymerization conditions until its contents are substantially completely polymerized.

The polymer used in this invention is methyl methacrylate polymer and the operative conditions of the invention have been worked out with specific reference to this polymer. However, this does not preclude the use of other polymers in minor proportions up to 3% or so of the total polymer used. Example V shows the use of isobutyl methacrylate polymer in minor proportions, this polymer having solvent characteristics similar to methyl methacrylate polymer. It has been found that the use of other polymers of roughly the same solvent characteristics as methyl methacrylate polymer in such slight proportions has no appreciable effect on the resulting casting other than might be expected with respect to such qualities as the hardness, toughness, and the like of the casting. The addition of such polymers does not require any modification of the operative conditions.

While the particle size of the polymer used is not sharply critical, granular polymer must be used. The objection to using particles of too great size is that they tend to dissolve unevenly with the consequence that the balance of heat input and outgo in the polymerizing mass is not closely controlled; if sufficiently out of balance, this obviously would have the effect of dissipating the prime advantage of this invention. On the other hand, if the particle size is too fine, solution of the polymer occurs too quickly and there is no heat absorption when the polymerization reaction reaches its peak. Practically, the granules should be substantially such that they will pass through a 20-mesh screen and be retained on a 150-mesh screen. It is preferred to use particles most of which pass a 60-mesh screen and are retained on a 80-mesh screen. Mesh sizes throughout are based on the Standard Screen Scale as given in the American Chemical Society Yearbook, 1921-1922.

Likewise, small proportions of monomers other than methyl methacrylate monomer and monomeric glycol diesters may be included as shown in Example II. Up to 5% or so of the total monomer may be of some other monomer without necessitating any essential changes in the conditions herein set forth. Among other monomers that are suitable as additives may be mentioned isobutyl methacrylate, ethyl methacrylate and ethyl acrylate.

The proportion of polymer to monomer and of methyl methacrylate monomer to monomeric glycol diesters is clearly critical as on these proportions rests the control of the temperature of the polymerizing mass. It has been found that the control is very effective when 63 to 72 parts of methyl methacrylate polymer are used with 37 to 28 parts of the mixture of monomers and the mixture of monomers is within the limits of 50% to 80% methyl methacrylate monomer and 50% to 20% of monomeric glycol diesters. While exceeding these proportion limits does not necessarily mean that the polymerization reaction will run away or a defective casting will result, the advantages of this invention are lost very rapidly as the proportions used depart from those herein specified.

The use of a polymerization catalyst is not essential but it is well known in the art that polymerization takes place more quickly and the whole operation is more economical and easier to control if a polymerization catalyst is employed. In general, neither the type of catalyst nor the proportion of catalyst to monomer need vary from the conventional practice in the art. Since many precision castings are not visible to the eye in the finished article and hence their appearance is of no moment, it is feasible to employ the very effective cobalt salts as catalysts, for example, cobalt naphthenate, cobalt nitrate, cobalt chloride and cobalt bromide. As these catalysts tend to color the castings, they naturally cannot be used in ornamental castings except where the color they impart is desired.

Other catalysts well adapted for use in this invention include the aliphatic azo catalysts such as alpha alpha' azo diisobutyronitrile and alpha alpha' azo bis(alpha gamma dimethyl) valeronitrile. Other frequently used free radical catalysts such as lauroyl peroxide and benzoyl peroxide may also be used. These catalysts may be used either alone or in admixture with others as illustrated in the examples. As a general rule, not more than 1.0% catalyst, based on the weight of monomer, would be employed and, of course, the amount may be diminished down to zero.

Within reasonable limits other components may be added to the casting composition. Agents such as the various "aerosols" are often useful to prevent the casting sticking in the molds but the proportion necessary for this purpose is so negligible that it has no effect on the proportions of other components used. Also, inert fillers such as polyvinyl alcohol, salt, and styrene may be employed in considerable proportions to extend the monomer-polymer mixture.

The examples illustrate a number of variations in the manner of adding the ingredients to a mold. It is preferred to add catalysts, antisticking agents, and the like to the monomer or, at least to a portion of the methyl methacrylate monomer, and filter the resulting solution before adding it to the mold. Vibration of the mold to eliminate air bubbles is also advisable. While solution of the granular polymer in the mixture of monomers is quite slow at room temperature or lower, it is preferred not to combine the polymer and mixture of monomers more than a few hours before the polymerization is to take place. Obviously, if the polymer is allowed to dissolve to a large extent in the monomer before the polymerization is started, the whole balance of the system will be upset. Distribution of the granular polymer uniformly throughout the mass is desirable and takes place substantially automatically in the course of shaking out residual air bubbles.

Usually the polymerization will be carried out at moderately elevated temperatures of about 90° F. to 140° F. although the polymerization can be carried out at room temperature if a longer period of polymerization is not objectionable. Further, light-activated polymerization catalysts may be employed and the casting composition in a transparent mold subjected to light to effect polymerization. Obviously, the use of temperatures substantially in excess of 140° F. are not desirable as the chief advantage of the invention is the ability to polymerize the mass at economical speeds without involving high temperatures so that excessive shrinkage of the casting is avoided.

The present invention is adapted for the production of a wide variety of cast articles. A particular advantage of the invention is that it lends itself to the production of cast articles which require a considerable degree of precision such as optical castings. A further advantage of the invention is that, while it enables the art to produce cast articles heretofore considered substantially impossible to make by polymerization of monomeric compounds in molds, the procedure of this invention does not require any labor more skilled than conventional casting operations nor are any factors involved which tend to greatly increase the cost of the casting.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing a casting which comprises introducing into a mold 63 to 72 parts of granular methyl methacrylate polymer and 37 to 28 parts of a mixture of 50% to 80% of methyl methacrylate monomer and 50% to 20% of the monomeric dimethacrylate esters of a mixture of glycols having the formula

wherein $n$ is an integer, the mixture of glycols having an average molecular weight between 185 and 270, and subjecting said mold to a temperature between room temperature and 140° F. until the contents thereof are substantially completely polymerized.

2. Process of preparing a casting which comprises introducing into a mold 63 to 72 parts of granular methyl methacrylate polymer and 37 to 28 parts of a mixture of 50% to 80% of methyl methacrylate monomer and 50% to 20% of the monomeric dimethacrylate esters of a mixture of glycols having the formula

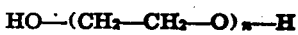

wherein $n$ is an integer, the mixture of glycols having an average molecular weight between 185 and 270, and subjecting said mold to a temperature of 90° F.-140° F. until the contents thereof are substantially completely polymerized.

3. Process of preparing a casting which comprises introducing into a mold 63 to 72 parts of granular methyl methacrylate polymer of particle size substantially passing a 20-mesh screen and being retained on a 150-mesh screen and 37 to 28 parts of a mixture of 50% to 80% of methyl methacrylate monomer and 50% to 20% of the monomeric dimethacrylate esters of a mixture of glycols having the formula $$HO-(CH_2-CH_2-O)_n-H$$

wherein $n$ is an integer, the mixture of glycols having an average molecular weight between 185 and 270, and subjecting said mold to a temperature of 90°-140° F. until the contents thereof are substantially completely polymerized.

4. Process of preparing a casting which comprises introducing into a mold 63 to 72 parts of granular methyl methacrylate polymer and 37 to 28 parts of a mixture of 50% to 80% of methyl methacrylate monomer and 50% to 20% of the monomeric dimethacrylate esters of a mixture of glycols having the formula $$HO-(CH_2-CH_2-O)_n-H$$

wherein $n$ is an integer, the mixture of glycols having an average molecular weight between 185 and 270, vibrating the mold to remove residual air bubbles from the contents thereof, and subjecting said mold to a temperature between room temperature and 140° F. until the contents thereof are substantially completely polymerized.

5. A composition adapted for casting and composed of 63 to 72 parts of granular methyl methacrylate polymer and 37 to 28 parts of a mixture of 50% to 80% of methyl methacrylate monomer and 50% to 20% of the monomeric dimethacrylate esters of a mixture of glycols having the formula $HO-(CH_2-CH_2-O)_n-H$ wherein $n$ is an integer, the mixture of glycols having and average molecular weight between 185 and 270.

6. A composition adapted for casting and composed of 63 to 72 parts of granular methyl methacrylate polymer of particle size substantially passing a 20-mesh screen and being retained on a 150-mesh screen and 37 to 28 parts of a mixture of 50% to 80% of methyl methacrylate monomer and 50% to 20% of the monomeric dimethacrylate esters of a mixture of glycols having the formula $$HO-(CH_2-CH_2-O)_n-H$$

wherein $n$ is an integer, the mixture of glycols having an average molecular weight between 185 and 270.

7. A composition adapted for casting and composed of 63 to 72 parts of granular methyl methacrylate polymer of particle size substantially passing a 20-mesh screen and being retained on a 150-mesh screen and 37 to 28 parts of a mixture of 50% to 80% of methyl methacrylate monomer and 50% to 20% of the monomeric dimethacrylate esters of a mixture of glycols having the formula $$HO-(CH_2-CH_2-O)_n-H$$

wherein $n$ is an integer, said mixture having an average molecular weight of approximately 200.

BARNARD MITCHEL MARKS.

REFERENCES CITED

The following references are of record in the file of this patent:

UNITED STATES PATENTS

| Number | Name | Date |
|---|---|---|
| 2,101,107 | Strain | Dec. 7, 1937 |
| 2,332,461 | Muskat | Oct. 19, 1943 |
| 2,347,320 | Hiltner | Apr. 25, 1944 |

Certificate of Correction

Patent No. 2,468,094.  April 26, 1949.

BARNARD MITCHEL MARKS

It is hereby certified that errors appear in the printed specification of the above numbered patent requiring correction as follows:

Column 5, line 46, Example IV, for "Lauroyl" read *Lauroyl peroxide*; column 10, line 3, for "and" after "having" read *an*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*